Feb. 21, 1933.   H. M. LEWIS   1,898,366
FREQUENCY TRANSFORMATION SYSTEM
Original Filed June 21, 1927
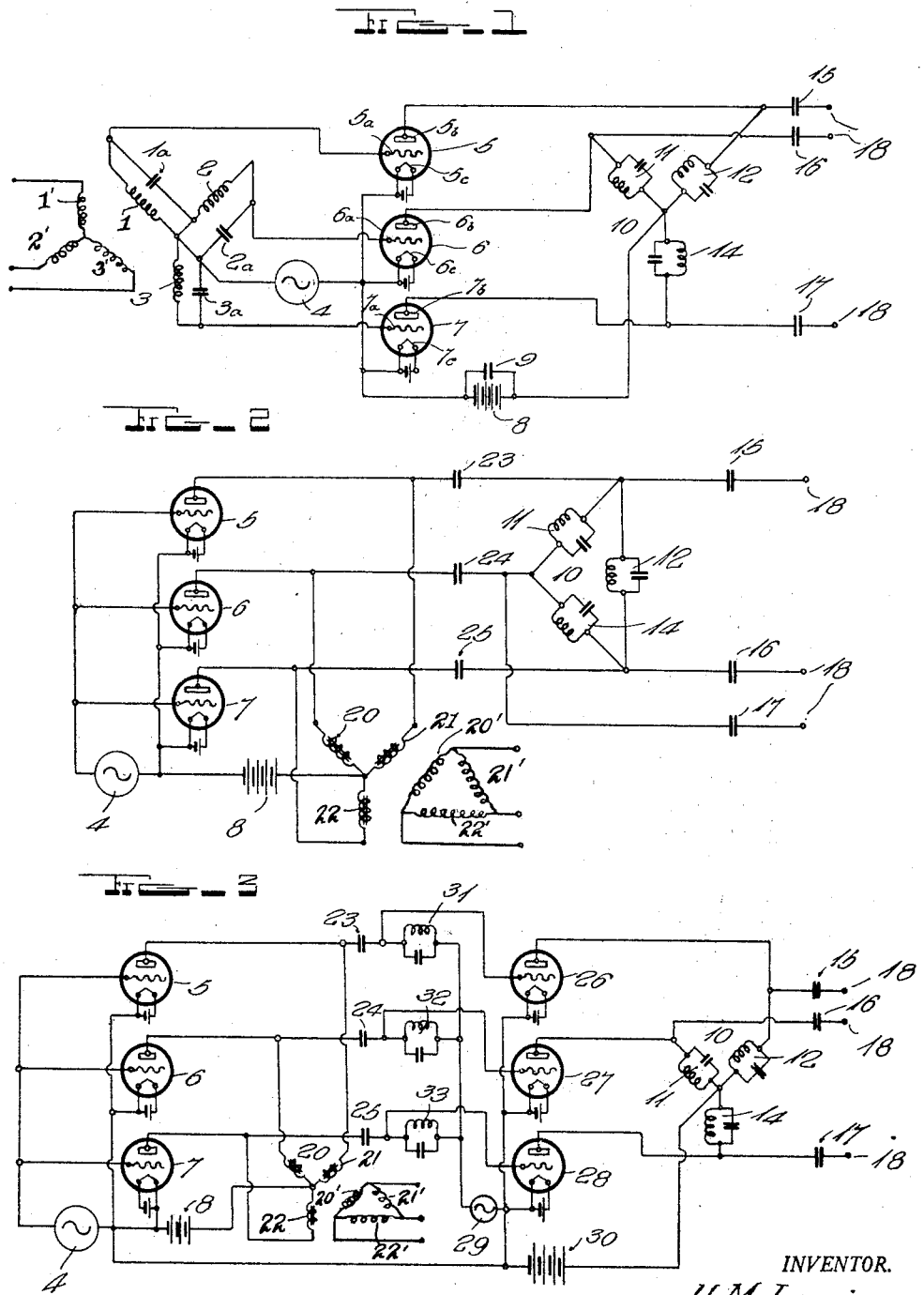
INVENTOR.
H. M. Lewis,
BY John B Brady
ATTORNEY.

Patented Feb. 21, 1933

1,898,366

UNITED STATES PATENT OFFICE

HAROLD M. LEWIS, OF DOUGLASTON, NEW YORK, ASSIGNOR, BY MESNE ASSIGNMENTS, TO WIRED RADIO, INC., OF NEW YORK, N. Y., A CORPORATION OF DELAWARE

FREQUENCY TRANSFORMATION SYSTEM

Application filed June 21, 1927, Serial No. 200,496. Renewed June 29, 1931.

My invention relates broadly to frequency transformation systems and more particularly to a system for increasing the frequency of polyphase currents.

One of the objects of my invention is to provide a polyphase transformation system by which polyphase low frequency currents may be increased to polyphase high frequency currents for securing high frequency polyphase currents with minimum apparatus requirements.

Still another object of my invention is to provide a system for obtaining polyphase high frequency current from a source of current of commercial frequency such as 60 cycles, which is commonly available in polyphase form.

A further object of my invention is to provide a circuit arrangement for the generation of three phase high frequency currents from a commercial source of three phase low frequency current with amplifier circuit arrangements requiring a minimum number of adjustments for securing three phase high frequency current.

My invention will be more clearly understood from the specification hereinafter following by reference to the accompanying drawing in which:

Figure 1 illustrates a circuit arrangement showing the principles of my invention; Fig. 2 shows a modified circuit arrangement by which three phase high frequency current may be obtained from three phase low frequency current in accordance with my invention; and Fig. 3 illustrates an arrangement for obtaining three phase high frequency current from three phase low frequency current in a plurality of steps.

My invention is directed to a polyphase transformation system, the three phase circuit being a particular and most useful application of the circuit. The polyphase currents desired are broadly produced by modulation. It might also be correctly termed a rectification or heterodyne system. This requires that the translating means shall have a non-linear relation between input voltage and output current, (as for example, a square law action) common in vacuum tubes when used as detectors or modulators. When two different frequency voltages are applied to the input circuit of a vacuum tube there appears in the output circuit, in addition to these original frequencies, a sum frequency and a difference frequency as well as harmonic frequencies.

If the phase of one of the input frequencies remains fixed and the phase of the other frequency is changed, the phase of the sum and of the difference frequencies changes a like amount.

Where the translating device is a vacuum tube operating according to a square law, and the applied input voltages are represented by, $$e_1 = E_1 \sin (2\pi f_1 t - \phi)$$
$$e_2 = E_2 \sin (2\pi f_2 t)$$

Then the current in the output circuit will be; in part—

$$i = (i_1 + i_2^2)k = ki_1 \sin^2(2\pi f_1 t - \phi) + ki_2 \sin^2(2\pi f_2 t) + k[2i_1 i_2 \sin (2\pi f_1 t - \phi) \sin (2\pi f_2 t)]$$

The first two terms when expanded show harmonic frequencies while the last term consists of the sum and difference frequencies as follows:

$$k[2i_1 i_2 \sin (2\pi f_1 t - \phi) \sin (2\pi f_2 t)] = ki_1 i_2 \sin (2\pi f_1 t - \phi) \sin (2\pi f_2 t) + ki_1 i_2 \cos (2\pi f_1 t - \phi) \cos (2\pi f_2 t) + ki_1 i_2 \sin (2\pi f_1 t - \phi) \sin (2\pi f_2 t) - ki_1 i_2 \cos (2\pi f_1 t - \phi) \cos (2\pi f_2 t) =$$
$$\underbrace{ki_1 i_2 \cos [2\pi (f_1 - f_2)t - \phi]}_{\text{difference frequency}} - \underbrace{ki_1 i_2 \cos [2\pi (f_1 + f_2)t - \phi]}_{\text{sum frequency}}$$

The above mathematics show that the phase of the produced sum and difference frequency depend on the phase angle of the original frequencies.

Referring to the drawing in detail, I have shown a Y connected transformer secondary circuit including inductances 1, 2 and 3 shunted by capacities 1a, 2a, and 3a, respectively upon which three phase current of a commercial frequency, such as the usually available 60 cycle frequency may be impressed through the action of the primary windings 1', 2' and 3'. Connected to the Y connected circuit I provide a source of high frequency represented at 4, which may be for example, an electron tube oscillator with the input and output circuits thereof coupled for the generation of any desirable frequency, such as, for example, a frequency of 20,000 cycles. Electron tubes 5, 6 and 7 are connected to the circuits of the Y connected system and the high frequency generator as illustrated. Electron tube 5 includes grid electrode 5a, plate electrode 5b and filament electrode 5c, with the grid electrode 5a thereof connected to the terminal of the inductance 1. Electron tube 6 includes grid electrode 6a, plate electrode 6b and filament electrode 6c, with the grid electrode 6a thereof connected to the terminal of inductance 2. The electron tube 7 includes grid electrode 7a, plate electrode 7b and filament electrode 7c, with the grid electrode 7a connected to the terminal of inductance 3. The filaments 5c, 6c and 7c are connected to a common bus and to the source of high frequency energy represented at 4. The output circuits of the electron tubes 5, 6 and 7 are connected in Y, as represented at 10. The plate electrode 5c connects to tuned circuit 12. The plate electrode 6b connects to the tuned circuit 11. The plate electrode 7b connects to tuned circuit 14. A common lead extends from the Y connected circuit 10 to the common bus which interconnects the filaments 5c, 6c and 7c, including the source of potential 8 shunted by the by-pass condenser 9. The terminals of the frequency transformation system are represented at 18 connected through condensers 15, 16 and 17 in each side of the high frequency system. The arrangement of the electron tubes is such that their three input or grid circuits are excited in phase by a voltage of the frequency of the generator 4 (for example 20,000 cycles) and also these three grids are excited in three phase relation with respect to each other by a voltage of commercial frequency (for example 60 cycles). The sum frequency of 20,060 cycles and difference frequency of 19,940 cycles appear in the output circuit of each tube but in three phase relation. In the diagram shown the sum frequency of 20,060 cycles is shown as selected in each output circuit by means of the tuned circuits 11, 12 and 14, hence giving a three phase output of 20,060 cycles. The three phase high frequency output can be readily changed in frequency by changing the circuit constants of the electron tube generator designated generally at 4, and in this way any desired three phase high frequency can be produced. The currents in the output circuit 10 will be 120 electrical degrees apart so that the high frequency energy follows the phase displacement of the currents from the low frequency source.

In Fig. 2 I have shown the grid circuits of electron tubes 5, 6 and 7 excited in phase by a high frequency source of 20,000 cycles. The three phase low frequency source of, for exemple 60 cycles, is shown applied as a modulating voltage from the Y connected transformer circuit including secondary windings 20, 21 and 22 and primary windings 20', 21', and 22'. The three phase 60 cycles current is supplied to the plate electrodes of each of the tubes 5, 6 and 7, so that the phase relation of the modulating voltage on any one plate with respect to the other is 120 electrical degrees. The sum and difference frequencies are produced in the output circuit including the delta connected system 10 having branches 11, 12 and 14. The difference frequency may be selected in this case by selection of the constants of the circuits 11, 12 and 14 to give a three phase output of 19,940 cycles. Condensers 23, 24 and 25 are shown for permitting the high frequency to be passed to the output circuits while preventing interference from the modulating current of 60 cycles.

In Fig. 3 I have illustrated a circuit arrangement for effecting the frequency transformation in a plurality of steps. The three phase 60 cycle supply currents is delivered by the Y connected transformer system 20—21—22; 20'—21'—22'' to the input circuits of Y connected tubes 26, 27 and 28. The source 4 in the circuit arrangement of Fig. 3 may be, for example, 940 cycles to effect in the output circuit of tubes 5, 6 and 7 a three phase frequency of 1,000 cycles where the sum frequency is selected. The electron tubes 26, 27 and 28 are arranged in circuit with the single phase high frequency source 29 which may be, for example, 15,000 cycles, and then with the impression of the 1,000 cycles three phase current upon the Y connected electron tube circuit the sum frequency may be selected in the output circuit for the generation of 16,000 cycles. I have illustrated circuits 31, 32 and 33 each tuned to 1,000 cycles, that is the sum frequency derived by the combination of the 940 cycle frequency from source 4 and the three phase 60 cycle frequency from transformer system 20—21—22. The condensers 23, 24 and 25 are series connected with the circuits 31, 32 and 33 for eliminating the 60 cycle frequency therefrom while permitting the passage of the 1,000 cycle frequency by the selectivity of the output circuit as are also any harmonic frequencies.

It should be noted that the high frequency single phase voltage as used in the several circuits does not appear in the three phase output circuit but cancels out there being zero voltage at this frequency between the output three phase lines. The low frequency three phase as applied is excluded by the selectivity of the output circuits as are also any harmonic frequencies. It is also possible that the frequency applied in common phase may be the lower, and that applied in polyphase may be the higher frequency and in such a case the polyphase frequency produced in the output would be higher in frequency than that at the input if the sum frequency were selected but lower in frequency if the difference frequency were selected. This latter case would be a reduction in frequency.

While I have described by invention in certain preferred embodiments, I desire that it be understood that modifications may be made by those skilled in the art to which the invention appertains within the scope of the appended claims without departing from the spirit of my invention.

What I claim as new and desire to secure by Letters Patent of the United States is as follows:

1. A frequency transformation system comprising a plurality of electron tubes having input and output circuits, said input and output circuits being connected in three phase relation, means for exciting said input circuits from a source of low frequency three phase current, connections for impressing a single phase high frequency current on the input circuits of said electron tubes, and means connected with said electron tubes for selecting the sum of the frequencies of said low and high frequency currents and impressing said sum frequency on the output circuit.

2. In a frequency transformation system a polyphase circuit including a plurality of electron tubes having an input system and an output system, a source of polyphase current connected with said input system, a source of single phase current connected with said input system said single phase source having a frequency higher than the frequency of said polyphase source, and a polyphase oscillatory circuit connected with the output circuit of said system.

3. A frequency transformation system comprising a plurality of electron tubes connected in a polyphase circuit, an input system connected with said electron tubes, an output system connected with said electron tubes, a source of low frequency polyphase alternating current for exciting said input system, a source of single phase energy for exciting said input system, said single phase source having a frequency more than double the frequency of said polyphase source and a polyphase work circuit connected to said output system said work circuit adjusted to the sum of the frequencies of the polyphase and single phase sources.

4. A frequency transformation system comprising a polyphase circuit, a source of polyphase current connected with said circuit, an independent source of single phase current connected with said circuit, said source of single phase current having a frequency greatly in excess of the frequency of said polyphase source and a plurality of means connected with said polyphase circuit for selecting and deriving a polyphase current having a frequency equal to the difference of the frequencies of said sources.

5. A frequency transformation system comprising a plurality of electron tubes having their input and output circuits connected in a three phase circuit, a source of three phase alternating current impressed upon said input polyphase circuit, a source of single phase alternating current connected with said polyphase input circuit for impressing a single phase electromotive force upon the inputs of said electron tubes, said source of single phase current having a frequency greatly in excess of the frequency of said source of three phase current and Y-connected selectively tuned circuits connected to the output circuit of said electron tubes.

6. A frequency transformation system comprising a plurality of sets of electron tubes, each set of said electron tubes being electrically connected in three phase relation, the output circuits of one set of electron tubes being connected to the input circuits of a succeeding set of electron tubes, a work circuit connected with the last mentioned set of electron tubes, a source of single phase alternating current connected to the input of each of said sets of electron tube circuits, and a source of polyphase current having a frequency substantially less than the frequency of said single phase source disposed between the output circuit of one set of electron tubes and the input circuit of the succeeding set of electron tubes for generating polyphase currents having a frequency substantially equal to the sum of the frequencies of said single phase and said polyphase sources.

7. A frequency transformation system comprising a set of electron tubes having their input and output circuits connected in polyphase arrangement, a polyphase work circuit connected with the output circuit of said electron tubes, a source of single phase current connected with the input circuits of said electron tubes, a source of polyphase current connected with the input circuits of said electron tubes said source of polyphase current having a frequency substantially less than the frequency of said single phase source, and circuits for impressing the integral effects of said currents upon said work circuit for developing polyphase current in said work circuit having a frequency equal to the sum of the frequencies of said sources.

8. In a frequency transformation system a polyphase circuit including a plurality of electron tubes having an input system and an output system, a source of polyphase current included in said input system, an independent source of single phase current included in said input system said independent source of single phase current having a frequency greatly in excess of the frequency of said source of polyphase current, and means in said output system for selecting the difference frequency with respect to said sources for deriving a high frequency polyphase current in said output system.

9. A frequency transformation system comprising in combination a plurality of electron tubes having input circuits and output circuits said input circuits being excited from a single phase source of supply, a polyphase source of supply arranged in the said output circuits in such a manner that the output of each electron tube is modulated by energy received from separate phases of said polyphase supply said polyphase source of supply having a frequency lower than the frequency of the single phase source of supply, and oscillatory circuits connected in a polyphase arrangement in said output circuits of said electron tubes for the production of polyphase oscillations having a frequency in excess of the frequency of said single phase source of supply.

10. In a frequency transformation system comprising a polyphase source of supply, a single phase source of supply having a frequency higher than that of the polyphase source, a polyphase oscillatory circuit, and a plurality of electron tubes having a common input circuit and a plurality of output circuits, said input circuit being connected to said single phase source of supply and said output circuits being connected to said polyphase oscillatory circuit, said polyphase source of supply being connected to said electron tubes in such a manner that there is produced a multiplicity of frequencies each bearing a certain relation to the frequency of said single phase source of supply and said polyphase source of supply and each having certain angular displacement with respect to each other and each phase of said polyphase oscillatory circuits being tuned to one of the frequencies characterized by this angular displacement.

11. The method of producing polyphase high frequency current which comprises combining current from a single phase high frequency source with each phase of a polyphase low frequency source and separately modulating the high frequency with each phase of the low frequency for producing polyphase sum and difference frequencies.

12. The method of producing a polyphase high frequency which comprises co-mingling a single phase high frequency with each of a plurality of phases of a polyphase low frequency and thereby deriving separately phased modulations of the high frequency for producing polyphase sum and difference frequencies.

13. The method of producing a polyphase high frequency which comprises co-mingling a single phase high frequency with each of a plurality of phases of a polyphase low frequency, separately modulating the high frequency with each phase of the low frequency whereby polyphase sum and difference frequencies are produced and selecting the sum frequencies when such are desired to the partial or substantial exclusion of the difference frequencies.

14. The method of producing for transmission a polyphase high frequency current which consists in modulating a single phase high frequency separately with each phase of a polyphase low frequency and selecting out for transmission one but not both of the sum and difference polyphase high frequencies thus produced.

15. The method of producing for transmission a polyphase high frequency current which consists in distorting separately each phase of a polyphase low frequency by co-mingling the same with a single phase high frequency and selecting out for transmission one but not both of the sum and difference polyphase high frequencies thus produced.

16. The method of producing polyphase high frequency current which comprises individually modulating a single phase high frequency current with each phase of a polyphase low frequency current.

17. A system for the production of polyphase high frequency current comprising a source of polyphase low frequency current, a source of single phase high frequency current and a plurality of asymmetrically responsive devices corresponding in number to said phases, each said device having an input circuit connecting with said high frequency source and an output circuit connection to an individual phase branch of said low frequency source and means for selecting for transmission one but not both of the sum and difference frequencies.

18. A polyphase high frequency transformation system comprising a source of polyphase low frequency currents, a source of single phase high frequency current, an electron tube system having input circuits connecting with said source of high frequency current and having output circuits connecting individually to the respective phase branches of said low frequency currents, a filter system connecting between the phase branches of said low frequency currents, a source, and means for effecting a nonlinear relation in said electron tube system between the input voltage and the output currents for derivation of sum and difference frequencies one of which last named frequencies together with the low frequencies of said source of polyphase currents is substantially suppressed by the said filter system.

19. The method of producing a polyphase high frequency which comprises co-mingling a single phase high frequency with each of a plurality of phases of a polyphase low frequency, separately modulating the high frequency with each phase of the low frequency whereby polyphase sum and difference frequencies are produced and selecting the difference frequencies when such are desired to the partial or substantial exclusion of the sum frequencies.

In testimony whereof I affix my signature.

HAROLD M. LEWIS.